(12) United States Patent
Luxford

(10) Patent No.: US 12,110,175 B2
(45) Date of Patent: *Oct. 8, 2024

(54) DISTRIBUTED MONITORING SYSTEM AND WASTE MANAGEMENT SYSTEM AND METHOD

(71) Applicant: Xorro Pty Ltd, Mt Hawthorn (AU)

(72) Inventor: Len Luxford, Mt Hawthorn (AU)

(73) Assignee: Xorro Pty Ltd, Mt Hawthorn (AU)

(*) Notice: Subject to any disclaimer, the term of this patent is extended or adjusted under 35 U.S.C. 154(b) by 590 days.

This patent is subject to a terminal disclaimer.

(21) Appl. No.: 17/116,982

(22) Filed: Dec. 9, 2020

(65) Prior Publication Data

US 2021/0086989 A1    Mar. 25, 2021

Related U.S. Application Data

(63) Continuation of application No. 16/439,516, filed on Jun. 12, 2019, now Pat. No. 10,889,436, which is a
(Continued)

(30) Foreign Application Priority Data

Oct. 23, 2012  (AU) ................ 2012904655
Apr. 14, 2013  (AU) ................ 2013205211

(51) Int. Cl.
*G01F 23/00*    (2022.01)
*B65F 1/14*     (2006.01)
(Continued)

(52) U.S. Cl.
CPC .............. *B65F 1/14* (2013.01); *G06Q 10/06* (2013.01); *G06Q 10/08* (2013.01); *G06Q 50/26* (2013.01);
(Continued)

(58) Field of Classification Search
CPC .............. A61G 12/004; A61G 2203/40; A61G 2203/72; G08B 21/18; G01F 17/00; G01F 23/00; G01F 23/0007

See application file for complete search history.

(56) References Cited

U.S. PATENT DOCUMENTS 4,773,027 A    9/1988  Neumann
5,214,594 A    5/1993  Tyler
(Continued)

FOREIGN PATENT DOCUMENTS

CN    201105894 Y    8/2008
CN    101364320 A    2/2009
(Continued)

OTHER PUBLICATIONS

New Zealand Intellectual Property Office examination report of Feb. 7, 2018.

*Primary Examiner* — Steven Lim
*Assistant Examiner* — Son M Tang
(74) *Attorney, Agent, or Firm* — patenttm.us

(57) ABSTRACT

A monitoring system comprises a plurality of monitoring stations disposed in or associated with a respective rubbish bin housing or surround. Each monitoring station comprising an identifier, a sensor for monitoring the bin or a detectable quality of the environment in which the bin is located, a processor for receiving a signal from the sensor and a transmitter for transmitting the signal.

12 Claims, 4 Drawing Sheets

Related U.S. Application Data continuation of application No. 14/438,109, filed as application No. PCT/AU2013/001184 on Oct. 14, 2013, now abandoned.

(51) Int. Cl.
*G01F 17/00* (2006.01)
*G06Q 10/06* (2023.01)
*G06Q 10/08* (2023.01)
*G06Q 50/26* (2012.01)
*H04Q 9/00* (2006.01)

(52) U.S. Cl.
CPC .......... *H04Q 9/00* (2013.01); *B65F 2210/128* (2013.01); *B65F 2210/1443* (2013.01); *B65F 2210/168* (2013.01); *B65F 2210/184* (2013.01); *B65F 2210/20* (2013.01); *G01F 17/00* (2013.01); *G01F 23/00* (2013.01); *H04Q 2209/20* (2013.01); *H04Q 2209/84* (2013.01)

(56) References Cited

U.S. PATENT DOCUMENTS

| | | | |
|---|---|---|---|
| 5,230,393 A * | 7/1993 | Mezey | B65F 3/08 177/139 |
| 5,448,220 A | 9/1995 | Levy | |
| 5,551,170 A | 9/1996 | Sakatani | |
| 5,610,596 A | 3/1997 | Petitclerc | |
| 5,774,876 A | 6/1998 | Woolley | |
| 5,792,661 A | 8/1998 | Cytron | |
| 5,959,568 A | 9/1999 | Woolley | |
| 5,960,402 A * | 9/1999 | Embutsu | G06Q 10/30 705/308 |
| 5,967,028 A | 10/1999 | Schomisch | |
| 6,123,017 A | 9/2000 | Little | |
| 6,223,769 B1 * | 5/2001 | Bragg | F16K 37/0058 137/557 |
| 6,367,377 B1 * | 4/2002 | Gawley | B65F 1/1638 100/229 A |
| 6,561,085 B1 | 5/2003 | Durbin | |
| 6,687,656 B2 | 2/2004 | Durbin | |
| 6,752,476 B2 | 6/2004 | Lin | |
| 7,330,128 B1 | 2/2008 | Lombardo | |
| 7,344,063 B2 | 3/2008 | Wagner | |
| 7,362,229 B2 | 4/2008 | Brinton | |
| 8,371,213 B2 | 2/2013 | Correale, Jr. | |
| 8,794,135 B1 | 8/2014 | Simon | |
| 8,953,841 B1 | 2/2015 | Leblang | |
| 9,163,974 B1 | 10/2015 | Kekalainen | |
| 9,384,129 B2 * | 7/2016 | Basu | G06F 16/1727 |
| 9,790,024 B2 * | 10/2017 | Sundholm | G06Q 10/30 |
| 2001/0051083 A1 * | 12/2001 | Fujiwara | B65F 3/00 414/21 |
| 2002/0108507 A1 * | 8/2002 | May | B65F 1/1638 700/229 |
| 2004/0046672 A1 | 3/2004 | Kasik | |
| 2006/0085940 A1 | 4/2006 | Chernoff | |
| 2007/0069885 A1 | 3/2007 | Twitchell, Jr. | |
| 2007/0080223 A1 | 4/2007 | Japuntich | |
| 2007/0260466 A1 | 11/2007 | Casella | |
| 2008/0077541 A1 | 3/2008 | Scherer | |
| 2008/0202357 A1 | 8/2008 | Flood | |
| 2009/0126473 A1 | 5/2009 | Porat | |
| 2010/0088203 A1 | 4/2010 | Hynes | |
| 2010/0230347 A1 * | 9/2010 | Haslem | B01D 17/0208 210/523 |
| 2010/0278620 A1 * | 11/2010 | Rimsa | B65F 3/041 414/408 |
| 2011/0116899 A1 | 5/2011 | Dickens | |
| 2011/0238598 A1 | 9/2011 | Borowski | |
| 2011/0297567 A1 * | 12/2011 | Maness | A61B 50/362 206/370 |
| 2012/0131364 A1 * | 5/2012 | Gromat | H04W 52/0261 713/320 |
| 2012/0194553 A1 * | 8/2012 | Osterhout | G06F 3/017 345/633 |
| 2012/0239710 A1 * | 9/2012 | Burka | G06F 12/0253 707/816 |
| 2012/0305132 A1 * | 12/2012 | Maness | A61J 1/14 141/69 |
| 2013/0002443 A1 | 1/2013 | Breed | |
| 2013/0173287 A1 * | 7/2013 | Cashman | H04N 7/141 705/2 |
| 2013/0278067 A1 | 10/2013 | Poss | |
| 2014/0125490 A1 | 5/2014 | Ullrich | |
| 2014/0278630 A1 * | 9/2014 | Gates | G06Q 10/047 705/7.13 |
| 2014/0379588 A1 | 12/2014 | Gates | |
| 2015/0144012 A1 | 5/2015 | Frybarger | |
| 2015/0339914 A1 * | 11/2015 | Kekalainen | G01D 11/245 340/506 |
| 2016/0134949 A1 | 5/2016 | Kekalainen | |
| 2016/0176630 A1 | 6/2016 | Shahabdeen | |
| 2016/0179065 A1 | 6/2016 | Shahabdeen | |
| 2019/0281369 A1 * | 9/2019 | Petkov | H04W 52/0261 |
| 2019/0382198 A1 * | 12/2019 | Qiu | G08B 21/18 |

FOREIGN PATENT DOCUMENTS

| | | |
|---|---|---|
| CN | 102063098 A | 5/2011 |
| CN | 102180323 A | 9/2011 |
| CN | 102556547 A | 7/2012 |
| CN | 102556548 A | 7/2012 |
| EP | 1302413 A1 | 4/2003 |
| EP | 1818281 A1 | 8/2007 |
| ES | 2114470 A1 | 5/1998 |
| GB | 2402737 A | 12/2004 |
| GB | 2446065 A | 7/2008 |
| GB | 2464383 A | 9/2011 |
| JP | 11-227903 A | 8/1999 |
| KR | 101155425 B1 | 6/2012 |
| WO | 2012/015664 A1 | 2/2012 |
| WO | 2012/164098 A1 | 12/2012 |
| WO | 2014/066429 A1 | 5/2014 |
| WO | 2014/114469 A1 | 7/2014 |

* cited by examiner

DISTRIBUTED MONITORING SYSTEM AND WASTE MANAGEMENT SYSTEM AND METHOD

FIELD OF THE INVENTION

The present invention relates to a distributed monitoring system based around rubbish bins and management of the collection of rubbish from rubbish bins.

BACKGROUND

In areas of higher density population, such as residential/office, retail and entertainment precincts, municipal organisations, such as local governments provide public rubbish bins for disposal of rubbish. Rubbish bins are also known as litter bins, trash cans and garbage cans. Traditionally these bins are fixed in location and emptied on a regular basis which depends on the extent of use of the bins in an overall sense. Typically this is weekly or daily. However each bin in an area will be used in differing amounts depending on the location of the bin within the collection area, special events and other factors. Aside from one-off collections during or after a special event at a specific location, the timing of collection from the bins, generally, does not vary. As a result the frequency of collection is usually sub-optimum and the frequency does not account for the waste level in each individual bin. This can result in bins that are not full being emptied unnecessarily and bins overfilling. In turn this results in poor use of the bins, the creation of litter and inefficient management of waste collection from the bins.

It is noted that rubbish is also known as trash, waste, refuse, litter, and garbage.

The present invention seeks to provide more effective waste collection.

The present invention seeks to provide distributed monitoring system.

SUMMARY OF THE PRESENT INVENTION

According to the present invention there is provided a detector for a bin comprising:
  a first sensor positioned to sense the level of rubbish in a bin and for creating a first signal representing the sensed rubbish level in the bin;
  a second sensor positioned to sense an aspect of the local environment surrounding the bin and for creating a second signal representing the local environment surrounding the bin;
  a processor configured to receive the first signal and determine the level of rubbish in the bin based on the received first signal as at least two discrete representations of the level of rubbish in the bin or as a representation of no rubbish in the bin;
  a processor configured to receive the second signal and determine a local environment factor based on the received second signal;
  an output for indicating the level of rubbish in the bin and the determined local environmental factor.

In an embodiment the first sensor is configured to determine the distance a beam travels before being reflected by rubbish in the bin. In one embodiment the beam is an ultrasonic beam. In another embodiment the beam is a light beam. In another embodiment the first sensor is configured to determine the weight of rubbish in the bin.

In an embodiment the second sensor is configured to sense pollution external to the bin and the second signal represents a pollution level in the local environment surrounding the bin.

In an embodiment the second sensor is configured to sense ultraviolet (UV) radiation external to the bin and the second signal represents a UV radiation level in the local environment surrounding the bin.

In an embodiment the second sensor is configured to sense a fire external to the bin and the second signal represents a fire in the local environment surrounding the bin.

In an embodiment the processor is configured to determine whether the level of rubbish in a bin has reached a predetermined level. In an embodiment the processor is configured to determine whether the level of rubbish in a bin has reached one of at least two predetermined levels.

In an embodiment the output is a visual indicator. In an embodiment the output is a transmitter for transmitting a level signal representing the level of rubbish in the bin and the determined local environmental factor.

In an embodiment the processor is configured to periodically receive the first sensor signal.

In an embodiment the transmitter is configured to periodically transmit the first signal.

In an embodiment the processor is configured to cause the transmitter to transmit the level first signal when the level of rubbish in the bin reaches one of the predetermined levels or when an environmental factor meets a condition.

In an embodiment the processor is configured to receive a poll signal prompting the processor to receive the sensor signals and to cause the transmitter to transmit the level signal and environmental factor.

In an embodiment the processor is configured to receive a poll signal prompting the processor to retrieve a stored sensor signal and to cause the transmitter to transmit the retrieved level signal and environmental factor.

In an embodiment the transmitter is configured to transmit an identifier of the bin with the level signal and environmental factor.

In an embodiment the environmental conditions comprise one or more of the following: whether a door of a bin surround is open, whether a near field transmitter is proximate to the bin; whether there is a fire detected in or near the bin; levels of gases, particles, noise level, temperature, humidity, pollen count, radiation or UV light in the vicinity of the bin.

In an embodiment the second sensor comprises a pollution sensor, and the processor is also configured to receive a signal form the pollution sensor indicating a pollution level as one or more elements of the environmental factor, and the processor is further configured to periodically transmit the pollution level signal, and or to transmit the pollution level signal upon command. In an embodiment the pollution sensor is arranged to measure air pollution external to the bin.

In an embodiment the second sensor comprises a "door open" sensor for sensing when a cover or door of the bin surround is open, and the processor is also configured to receive a signal form the "door open" sensor as one or more elements of the environmental factor, and the processor is further configured to monitor for the door open sensor to activate and/or to deactivate, and if a condition in relation to the door sensor is met to transmit a door open signal.

In an embodiment the second sensor comprises a near field identification sensor, and the processor is also configured to receive a signal form the near field identification sensor indicating whether a near field identifier is proximate to the bin as one or more elements of the environmental factor, and the processor is further configured to periodically transmit an identification signal, or if a condition in relation to the near field identifier being proximate to the bin is met to transmit an identification signal and or to transmit the an identification signal upon command. In an embodiment the condition is that the near field identifier is sensed for more than a predetermined period of time. In this example the waste collector will have a near field identifier, such as an RFID tag, and the timing of the waste collector can be monitored.

In an embodiment the detector further comprises a receiver for receiving a signal from another bin detector, and the processor is configured to receive the other bin's signal and the processor is further configured to cause the transmitter to retransmit the other bin's signal.

According to the present invention there is provided a detector for a bin comprising: a first sensor positioned to sense the level of rubbish in a bin and for creating a first signal representing the sensed rubbish level in the bin;
  a second sensor positioned to sense pollution in the local environment surrounding the bin and for creating a second signal representing the pollution in the local environment surrounding the bin;
  a processor configured to receive the first signal and determine the level of rubbish in the bin based on the received first signal as at least two discrete representations of the level of rubbish in the bin or as a representation of no rubbish in the bin;
  a processor configured to receive the second signal and determine a local pollution factor based on the received second signal;
  an output for indicating the level of rubbish in the bin and the determined local pollution factor.

According to the present invention there is provided a detector for a bin comprising:
  a first sensor positioned to sense the level of rubbish in a bin and for creating a first signal representing the sensed rubbish level in the bin;
  a second sensor positioned to sense a bin surround cover or door is open and for creating a second signal from the second sensor, wherein the bin surround cover or door is not a bin lid covering an opening of the bin;
  a processor configured to receive the first signal and determine the level of rubbish in the bin based on the received first signal as at least two discrete representations of the level of rubbish in the bin or as a representation of no rubbish in the bin;
  a processor configured to receive the second signal and determine whether the door is open based on the received second signal;
  an output for indicating the level of rubbish in the bin and the determination of whether the door is open.

According to the present invention there is provided a detector for a bin comprising:
  a first sensor positioned to sense the level of rubbish in a bin and for creating a first signal representing the sensed rubbish level in the bin;
  a second sensor positioned to sense whether there is a fire in or around the bin and for creating a second signal from the second sensor;
  a processor configured to receive the first signal and determine the level of rubbish in the bin based on the received first signal as at least two discrete representations of the level of rubbish in the bin or as a representation of no rubbish in the bin;
  a processor configured to receive the second signal and determine whether there is a fire in or around the bin based on the received second signal;
  an output for indicating the level of rubbish in the bin and the determined state of whether there is a fire in or around the bin.

According to the present invention there is provided a waste management system comprising
  a plurality of bins each having a rubbish level detector configured to transmit a level signal representing the level of rubbish in the respective bin, an environmental sensor configured to transmit a signal representing a surrounding environmental factor relevant to the surrounds of the respective bin and an identifier of the respective bin;
  a system receiver for receiving the level of rubbish in each bin, the surrounding environmental factor and the identifier of the respective bin;
  a system processor for determining which bins have reached a predetermined level of rubbish therein from the received level signals and bin identifiers and which bins need attention due to the received surrounding environmental factors and bin identifiers.

In an embodiment each bin also comprises a pollution detector configured to transmit a pollution level signal of the external environment surrounding the bin to the system receiver, and the system processor is also configured to determine when a pollution level at a location identified by the respective bin's identifier reaches a specified level.

In an embodiment each bin also comprises a "door open" detector configured to transmit a bin surround "door open" signal to the system receiver, and the system processor is also configured to determine whether the open door of the bin identified by the respective bin's identifier should be open according to a set of criteria and in the event that it should be open raises and alarm.

In an embodiment each bin also comprises a waste collector proximity detector configured to transmit a waste collector timing signal to the system receiver when waste collector is proximate to the bin, and the system processor is also configured to record the timing signal.

According to the present invention there is provided a method of reading a rubbish level in a bin comprising
  determining a distance of rubbish in a bin from a sensor;
  determining the level of rubbish in the bin based on the distance as at least two discrete representations of the level of rubbish in the bin or of no rubbish in the bin;
  outputting the level of rubbish in the bin and an identifier of the bin to a personal device of a waste collector such that the waste collector can be informed by the device whether the bin needs to be emptied when the waste collector is proximate to the bin.

According to the present invention there is provided a method of scheduling waste collection from or maintenance of a plurality of bins comprising
  receiving a signal representing a rubbish level, a signal representing a local environmental factor surrounding the bin and an identifier of the bin from each bin;
  determining which bins have reached a predetermined level of rubbish therein from the received level signals and bin identifiers;
  determining which bins have may require maintenance from the received local environmental factor signals and bin identifiers;
  scheduling waste collection for those bins that have reached the predetermined level and maintenance for those bins that have local environmental factors indicative of the need for maintenance.

In an embodiment the environmental factor signal is a signal representing that a door to a surround of the bin is open and maintenance is scheduled when the door should not be open.

In an embodiment the environmental factor signal is a signal representing a fire in or in the vicinity of the bin.

According to the present invention there is provided a method of waste collection comprising
- receiving a signal representing a rubbish level and an identifier of the bin from each bin;
- determining which bins have reached a predetermined level of rubbish therein from the received level signals and bin identifiers;
- determining the location of those bins that have reached the predetermined level;
- determining the position of a waste collector and whether a bin that has reached the predetermined level is proximate to the waste collector;
- indicating to the waste collector whether a respective bin determined to the proximate to the waste collector is to be emptied based on whether the proximate bin has reached the predetermined level.

According to the present invention there is provided a method of a waste collection comprising
- receiving a signal representing a rubbish level and an identifier of the bin from each bin;
- determining the position of a waste collector and whether a bin that is proximate to the waste collector has reached the predetermined level based on the received level signals and bin identifiers;
- indicating to the waste collector whether the proximate bin is to be emptied based on whether the proximate bin has reached the predetermined level.

In an embodiment the step of indicating to the waste collector comprises transmitting information to the waste collector for display on a personal device.

In an embodiment the step of indicating to the waste collector comprises transmitting information to the waste collector for display on an in-vehicle device.

In an embodiment the display is one or more of a metered level display, a screen, a projected head-up-display.

In an embodiment the step of indicating to the waste collector comprises transmitting information to the waste collector for display as a LED readout on a display device.

In an embodiment the step of indicating to the waste collector comprises transmitting information to the waste collector for display as an electronic map on a display device such as an electronic rear vision mirror.

In an embodiment the step of indicating to the waste collector comprises transmitting information to the waste collector for display as an augmented reality on a display device.

In an embodiment the augmented reality display indicates the level of rubbish in the bin or whether the bin is to be emptied or not. For example the bin may be augmented with an overlaid colour, say green, if the bin can be bypassed (it is empty) or a different colour, say red, if the bin if to have rubbish collected (it is full).

According to the present invention there is provided a method of a waste collection comprising
- receiving a signal representing a rubbish level of a bin;
- indicating to a personal device carried by a waste collector whether the bin is to be emptied based on the rubbish level signal.

In an embodiment the step of indicating to a personal device carried by a waste collector is triggered when the waste collector is proximal to the bin.

In an embodiment the step of indicating to the waste collector comprises display an indicia on an augmented reality display device.

In an embodiment the step of indicating to the waste collector comprises display an indicia on a map display device.

According to the present invention there is provided a rubbish level detector for a bin comprising:
- a plurality of sensors configured to sense local environmental conditions of the bin, at least one of which is a local environmental condition external to the bin, and for creating a signal representing the local environmental conditions;
- a transmitter configured to transmit a signal representative of the local environmental conditions and an identifier of the bin and/or a location of the bin.

In an embodiment one of the sensors detects pollution surrounding the bin.

In an embodiment one of the sensors detects UV radiation incident on the bin.

In an embodiment one of the sensors detects a fire in or external to the bin.

In an embodiment one of the sensors detects a bin surround door is open, wherein the bin surround door is not a bin lid covering an opening of the bin.

According to the present invention there is provided a system for reading a rubbish level in a bin comprising
- means for determining a distance of rubbish in a bin from a sensor;
- means for determining the level of rubbish in the bin based on the distance as at least two discrete representations of the level of rubbish in the bin or of no rubbish in the bin;
- means for sensing local environmental conditions surrounding the bin;
- means for outputting the level of rubbish in the bin, the local environmental conditions and an identifier of the bin.

According to the present invention there is provided a system for scheduling waste collection from or maintenance of a plurality of bins comprising
- means for receiving a signal representing a rubbish level, a signal representing a local environmental factor surrounding the bin and an identifier of the bin from each bin;
- means for determining which bins have reached a predetermined level of rubbish therein from the received level signals and bin identifiers;
- means for determining which bins have may require maintenance from the received local environmental factor signals and bin identifiers;
- means for scheduling waste collection for those bins that have reached the predetermined level and maintenance for those bins that have local environmental factors indicative of the need for maintenance.

According to the present invention there is provided a system for waste collection comprising
- means for receiving a signal representing a rubbish level and an identifier of the bin from each bin;
- means for determining which bins have reached a predetermined level of rubbish therein from the received level signals and bin identifiers;
- means for determining the location of those bins that have reached the predetermined level;

means for determining the position of a waste collector and whether a bin that has reached the predetermined level is proximate to the waste collector;

means for indicating to the waste collector whether a respective bin determined to the proximate to the waste collector is to be emptied based on whether the proximate bin has reached the predetermined level.

According to the present invention there is provided a system for a waste collection comprising means for receiving a signal representing a rubbish level and an identifier of the bin from each bin;

means for determining the position of a waste collector and whether a bin that is proximate to the waste collector has reached the predetermined level based on the received level signals and bin identifiers;

means for indicating to the waste collector whether the proximate bin is to be emptied based on whether the proximate bin has reached the predetermined level.

According to the present invention there is provided a system for a waste collection comprising means for receiving a signal representing a rubbish level of a bin;

means for indicating to a waste collector proximal to the bin whether the bin is to be emptied based on the rubbish level signal.

According to the present invention there is provided a monitoring system comprising a plurality of monitoring stations disposed in or associated with a respective rubbish bin housing or surround, each monitoring station comprising an identifier, a sensor for monitoring the bin and a detectable quality of the environment in which the bin is located, a processor for receiving a signal from the sensor a transmitter for transmitting the signal, wherein the system also comprises a receiver for receiving the transmitted signals from the bins.

According to the present invention there is provided a method of monitoring a plurality of locations comprising providing a plurality of monitoring stations disposed in or associated with a respective rubbish bin housing or surround, each monitoring station transmitting a signal representing a detectable quality of the environment surrounding the bin in which the respective bin is located; and receiving the transmitted signals from the bins.

In this specification the terms "comprising" or "comprises" are used inclusively and not exclusively or exhaustively.

Any references to documents that are made in this specification are not intended to be an admission that the information contained in those documents form part of the common general knowledge known to a person skilled in the field of the invention, unless explicitly stated as such.

DESCRIPTION OF DRAWINGS

In order to provide a better understanding of the present invention, preferred embodiments will now be described, by way of example only, with reference to the accompanying drawings in which.

DESCRIPTION OF EMBODIMENT OF THE INVENTION

Figure 1:
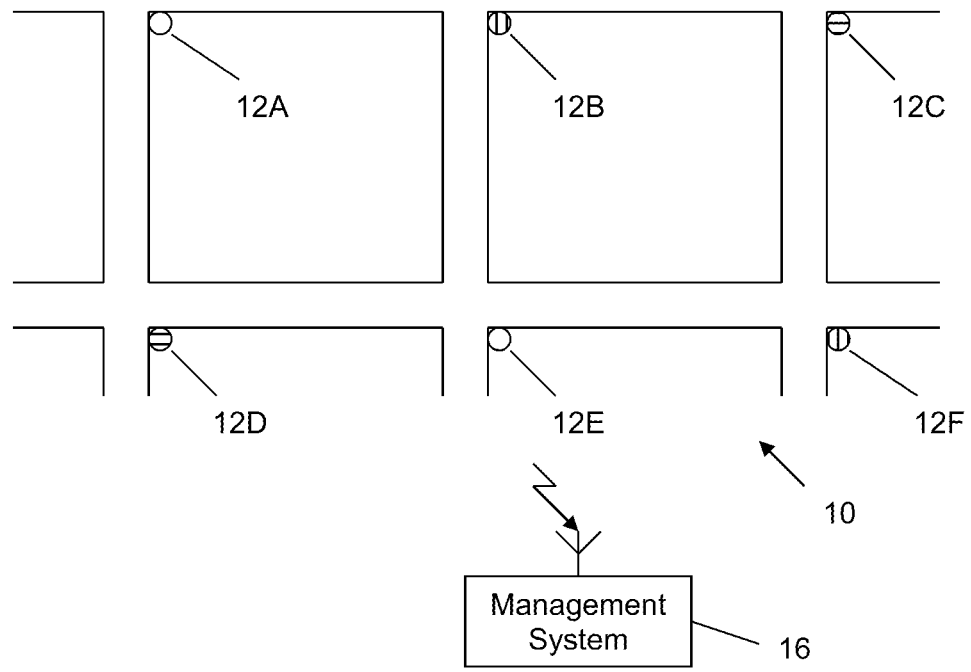
FIG. 1 is a schematic representation of an area in which there are a plurality of bins.

Referring to FIG. 1, there is shown an area 10 in which there are a plurality of rubbish bins (12A, 12B, 12C, 12D, 12E and 12F). Bins 12A and 12E are indicated as being empty (no shading). Bins 12B and 12F are indicated as being half full (horizontal shading) and bins 12C and 12D are indicated as being full (vertical shading).

In prior rubbish collection systems, at the end of a period of time a rubbish collector would collect the rubbish from all of these bins.

In the present invention bins 12C and 12D would be emptied, bins 12A and 12E would not be emptied and the remaining bins 12B and 12F may be emptied according to a set of criteria. For example a driver of a rubbish collection truck may be directed to take a path from bin 12C to bin 12B, travel past bin 12E to bin 12D. On this route bins 12C and 12D would be emptied, 12B could be emptied as the truck is travelling past, but the truck would not stop at 12E.

Alternatively the driver may go past all the bins, but the invention indicates the level to the driver and s/he can avoid stopping at empty bins 12A and 12E, could stop to empty half full bins 12D and 12F and would stop to empty full bins 12C and 12D.

This is able to be achieved by the driver receiving an indication of which bins to collect rubbish from. Each bin is installed with a detector for monitoring the bin and/or a quality of the environment in which the bin is located. In this embodiment the detector 40 comprises a rubbish level detector. In an embodiment each detector 40 is able to communicate the level of rubbish in each bin (12A-12F) to a monitoring system, which in this embodiment has a management system 16 for coordinating the collection of rubbish from the bins or for indicating to the waste collector 185 which bins to collect rubbish from.

Figure 2:
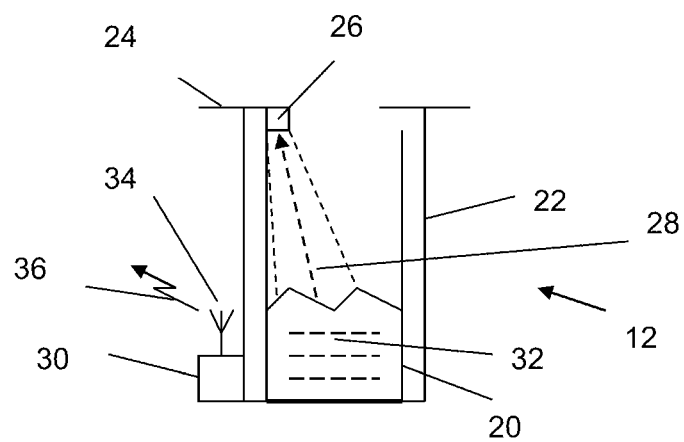
FIG. 2 is a schematic representation of a side cross section of a bin and surround according to an embodiment of the present invention.
Figure 3:
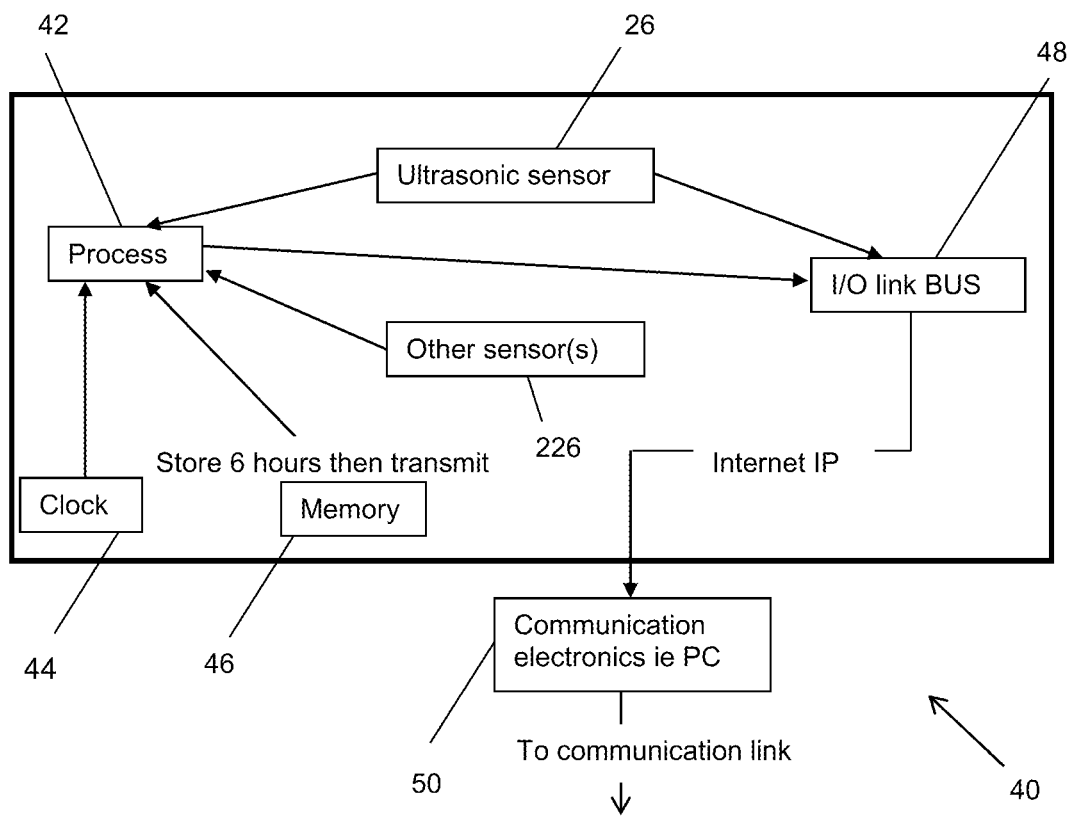
FIG. 3 is a block diagram of an embodiment of a rubbish level detector according to the present invention.

Referring to FIGS. 2 and 3 a rubbish level detector 40 is schematically shown and comprises a sensor 26 positioned at the top of the bin cover 24 or bin surround 22. In this embodiment the sensor 26 is able to sense the level of rubbish 32 in a bin 20. The bin cover 24 is mounted to the bin surround 22. A bin surround 22 is used as it makes a more pleasant view than the bin 20 inside. In an embodiment the sensor 26 emits a beam 28 that reflects off the rubbish. The sensor 26 generates a signal representing the distance from the sensor 26 to the rubbish level in the bin based on the travel time of the beam and its refection. In one embodiment the beam is an ultrasonic beam. In another embodiment the beam is a light beam.

As an alternative other types of sensor 26 could be used. For example the sensor could be configured to determine the weight of rubbish in the bin and an inference of the amount of rubbish in the bin determined according to its weight. Further there may be more than one sensor as will be described further below, including a sensor for measuring an environmental condition in the vicinity of the bin.

A processor 42 (housed in housing 30) receives a signal from the sensor(s) 26 and in this embodiment determines the level of rubbish 32 in the bin based on the received signal as one or more discrete representations of the level of rubbish 32 in the bin. For example the discrete representation could be a binary the bin is "empty" or "full" ("full" might mean near full as opposed to literally so as to avoid rubbish spilling over and "empty" is not full) or trinary indication such as "empty", "half-full" and "full". Other discrete levels can also be used, such as a level out of 10.

The processor 42 also determines environmental factors about the bin or its environment from the one or more other sensors.

The processor 42 controls an output for indicating the level of rubbish 32 in the bin and environmental factors. In this embodiment the output is a transmitter 50 in housing 30 which transmits data representing the level from an antenna 34 as a radio transmission 36. The radio transmission may be for example by WIFI, cellular network, "ZigBee" network, or otherwise. Alternatively the transmitter 50 may make a wired transmission. The housing 30 may be located on a top of the bin cover 24 or be raised above the cover by a pole.

In an embodiment the processor 42 is configured to determine whether the level of rubbish in a bin has reached a predetermined level. In an embodiment the processor 42 is configured to determine whether the level of rubbish in a bin has reached a plurality of predetermined levels. In an embodiment the processor 42 is configured to determine whether a door to the surround 22 of the bin is open. In an embodiment the processor 42 is configured to determine whether a near field device, such as an NFID transmitter is proximate to the bin.

In an embodiment the processor 42 is configured by a set of instructions stored on a storage device, the instructions controlling the processor 42 to operate as described herein.

The processor 42 receives a clock signal input from a clock 44. The processor 42 is able to store and retrieve information from memory 46. In one embodiment the clock 44 is used to determine the passage of a predetermined amount of time, such as hourly, to take a sensor measurement of the level of rubbish in the bin and of the environmental factors. These measurements can be stored in the memory 46. In an embodiment the clock 44 is also used to determine the passage of a second predetermined amount of time, such as 6 hours, after which the stored measurements are transmitted. The processor 42 interfaces with the sensor 26 and the transmitter 50 via an I/O interface 48. The elements of the detector 40 are shown coupled by a system bus or other mechanism.

In an embodiment the transmission used Internet Protocol packets, but other protocols may be used.

In an embodiment the processor is configured to cause the transmitter to transmit the level signal and/or environmental factors when the level of rubbish in the bin reaches predetermined level or when one or more of the environmental factors meets one or more conditions, such as for example the bin is being moved, the bin is on or near fire or pollution levels are above a certain level.

In an embodiment the processor is configured to receive a poll signal prompting the processor 42 to receive the sensor signal and to cause the transmitter to transmit the level signal.

In an embodiment the transmitter is configured to transmit an identifier of the bin with the level signal. Generally each bin will be allocated a number and this can be used as the identifier. Alternatively a GPS reading may be used.

In an alternative or in addition to transmitting the rubbish level the level may be output to a visual indicator mounted on the bin, such as a display or one or more lights.

The detector 40 may comprise other detectors, such as a pollution detectors, a temperature sensor (such as DHT22 or BMP085)), a UV sensor (such as UVI-01), a noise level sensor (such as a microphone), a humidity sensor (such as DHT22), an air pressure sensor (such as BMP085), a light sensor (such as an LDR with an ADC such as MCP3008), a particle sensor, a "door open" detector or a near field identification detector. Each of these detectors comprises another sensor 226 of the appropriate type which generates a signal representing the type of thing detected which is received and processed by the processor 42. The processor 42 may also transmit the signal or may only transmit a signal when certain criteria are met. These example detectors will be described in more detail further below. Pollution detectors may include gas and or particle sensors, such as carbon monoxide (such as MiCS-5525), carbon dioxide, nitrogen dioxide (such as MiCS-2710), ozone, sulphur dioxide measuring devices.

Figure 4:
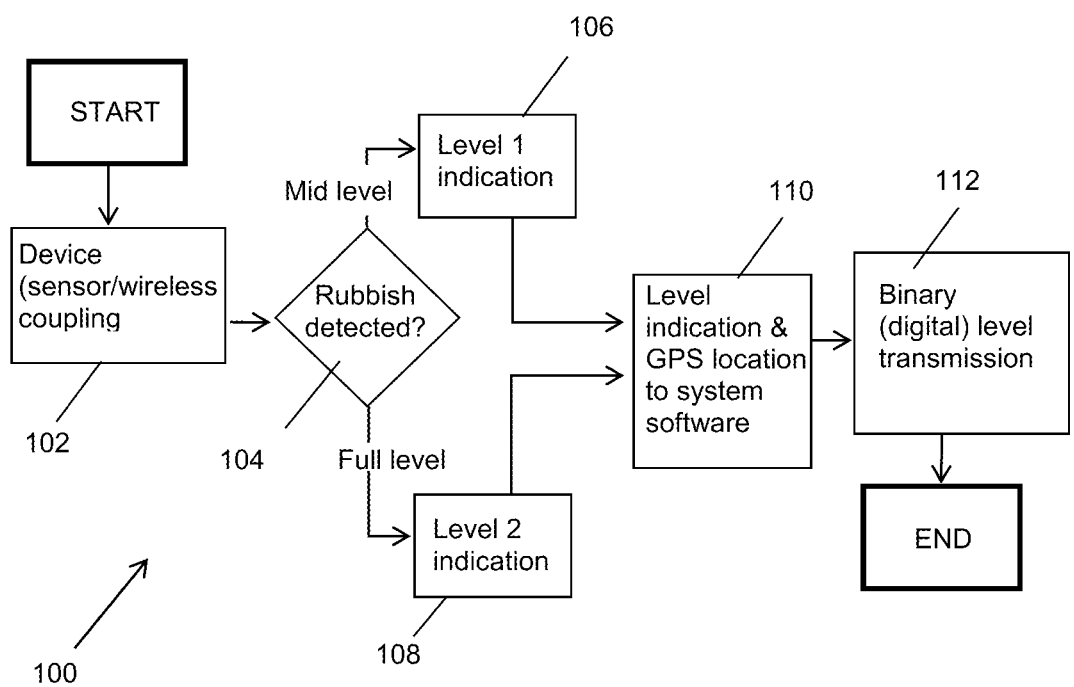
FIG. 4 is a flow chart of an embodiment of a method of reading a rubbish level in a bin according to the present invention.

Referring to FIG. 4 there is shown a method 100 of reading a rubbish level in a bin according to an embodiment of the present invention. This method is repeated every period for reading the rubbish level. This may be for example every 15 min. Sensor 26 is read at 102. The processor 42 performs a check of whether rubbish is detected at 104. If the distance to the level of the rubbish is less than a first predetermined amount, for example ⅓ of the height of the bin, then it registers as not detected, that is, "empty" (which differs from literally empty). If the reading is "empty" the process end. For housekeeping purposes the empty reading may be recorded in the memory 46.

Then if more than the first predetermined amount is detected, for example ¼ of the height of the bin, but less than a second predetermined amount, for example ⅔ of the height of the bin, then it registers as "half-full" as indicated by 106 and this reading is recorded in the memory 46.

If more than the second predetermined amount is detected, for example more than ⅔ of the height of the bin, then it registers as "full" as indicated by 108 and this reading is recorded in the memory 46.

In an embodiment until the next time the bin is emptied the first time the level gets to "half-full" and "full" the level and bin identifier (and in some cases a time stamp) are collected at 110 and transmitted at 112 to a receiver 162 of a waste management system 16 or to a device such as a device worn by the waste collection worker or mounted to a waste collection vehicle 185.

Figure 5:
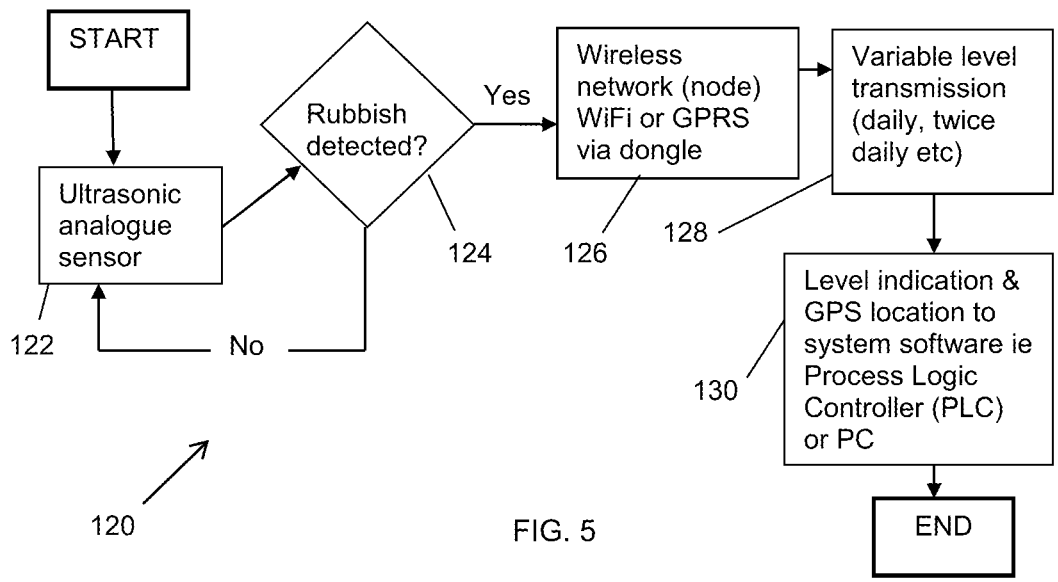
FIG. 5 is a flow chart of an embodiment of a method of reading a rubbish level in a bin according to the present invention.

Referring to FIG. 5 there is a method 120 of collecting information on bin levels, which commences with the sensor 26 taking a reading at step 122 and then checking 124 whether rubbish has be detected. If it has not been detected the process returns for another check after a suitable period of time. A similar process can be used by other types of detector.

If rubbish has been detected the amount is recorded. In this embodiment the level is not categorised and the measured level is sent. The transmitter 28 preferably wirelessly establishes communication with a wireless communications network at 126 and sends the information to the management system 16 at a variable time, such as daily or twice daily, as indicated by 128. The information transmitted to the management system 16 at 130 included the level indication and a location or bin identifier, such as GPS co-ordinates, or a bin identification number. The management system 16 may categorise the level (eg empty, half-full or full) or retain the level as a measurement.

Figure 6:
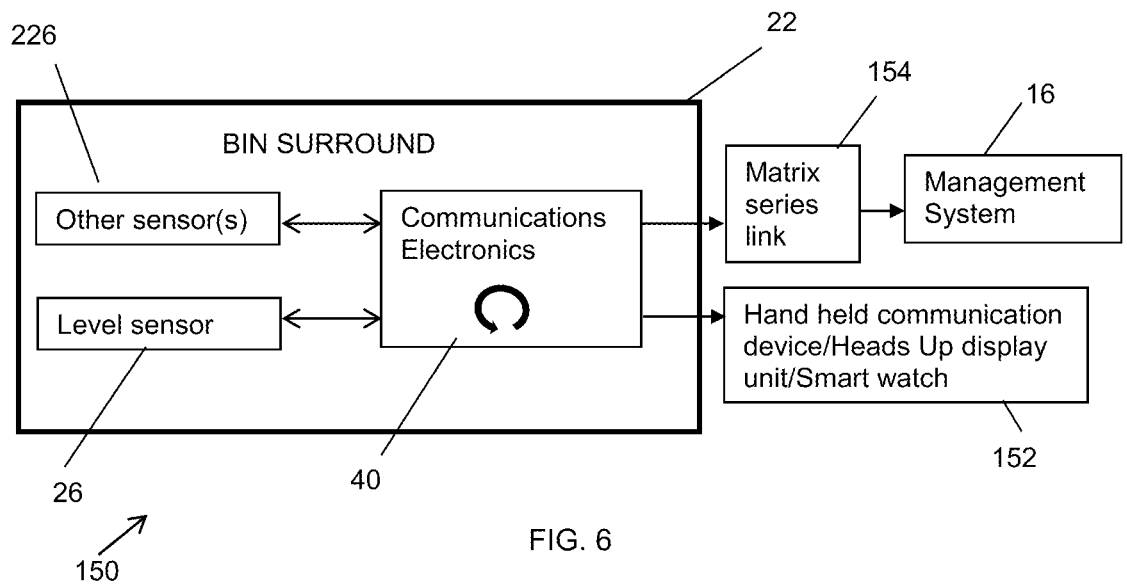
FIG. 6 is a block diagram of a waste management system according to an embodiment of the present invention.

Referring to FIG. 6 a system 150 is shown comprising the sensor 26, other sensor(s) 226 and other components of the detector(s) 40 in the bin surround 22 communicating via a matrix series link 154 with the management system 16 and with a personal device 152, which as a hand held device, heads up display unit or smart watch. Communication with the personal device 152 is in this embodiment established via local transmission, say within 50 m. The matrix series link 154 comprises a network of devices, such as other detectors on other bins, which are for example configured as a ZigBee network, which pass on the information from an individual bin through the network to a node, and which in turn communicates with the management system 16.

Figure 7:
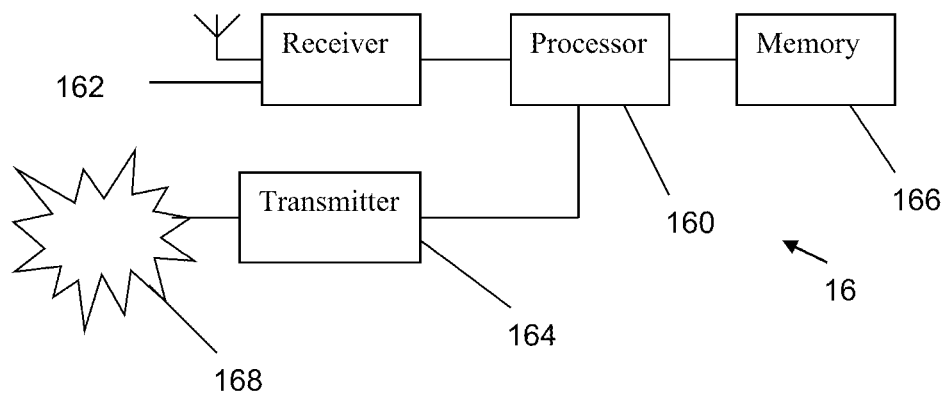
FIG. 7 is a block diagram of a management system according to an embodiment of the present invention.

Referring to FIG. 7, in an embodiment there is a monitoring system, configured as a waste management system 16, comprising a system receiver 162 for receiving a signal from the detectors of the bins. In this embodiment the signals represent the level of rubbish in each bin (12A-12F) along with the identifier of the respective bin. The system 16 further comprises a system processor 160 for processing the signals. In this embodiment, processing the signals is for determining which bins have reached a predetermined level of rubbish, such as "half-full" or "full", from the received level signals and bin identifiers. In an other embodiment processing the signals is to determine if an environmental condition is met. With this information the processor 160 can follow a set of rules or be manually controlled to coordinate the collection of rubbish form the bins and/or indicate to the waste collector which bins to collect rubbish from or which bins may require maintenance. For example if a bin that is meant to be stationary is moved then this may trigger an alert. Alternatively if environmental conditions indicate that the bin may be on fire (such as a high temperature reading or detection of combustion gases above normal background levels), then this may trigger an alert.

The system 16 also has a memory 166 for storing the received information for the bins and a transmitter 164 for transmission of collection information and/or bin levels to a waste collector 185 via a communications medium 168, such as the Internet.

The processor 160 may also be configured to transmit via transmitter a polling signal to the detectors 40 to receive on command signals from the detectors.

Figure 8:
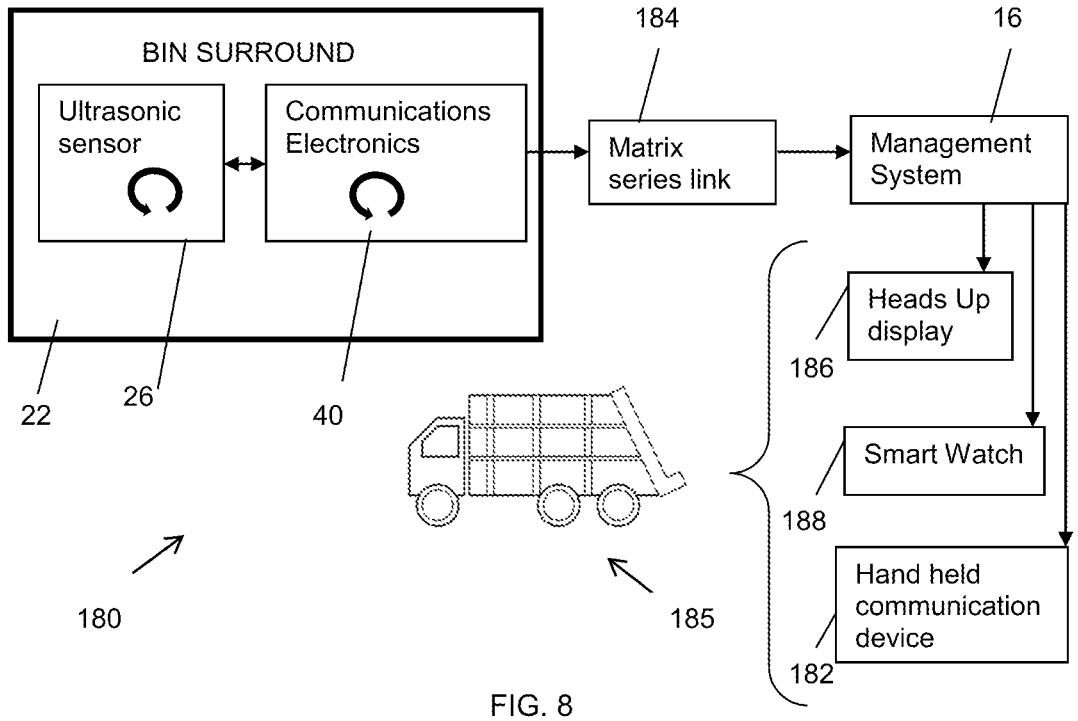
FIG. 8 is a block diagram of a waste management system according to an embodiment of the present invention.

Referring to FIG. 8 there is shown a system 180 comprising the sensor 26 and other components of the detection 40 in the bin surround 22 communicating via a matrix series link 184 with the management system 16. In this case the management system communicates with the personal device 182, such as a hand held device, a an electronic rear view mirror (RVM) display unit, heads up display unit 186 and/or smart watch 188. This communication may be for example via a cellular data network. One or more of the devices 182, 186 and 188 will typically be used in a rubbish truck/garbage truck 185 to inform the driver of whether a bin needs to be emptied on a set route, or to indicate a route required to be taken to attend to those bins in need of emptying and bypassing those bins that don't.

Figure 9:
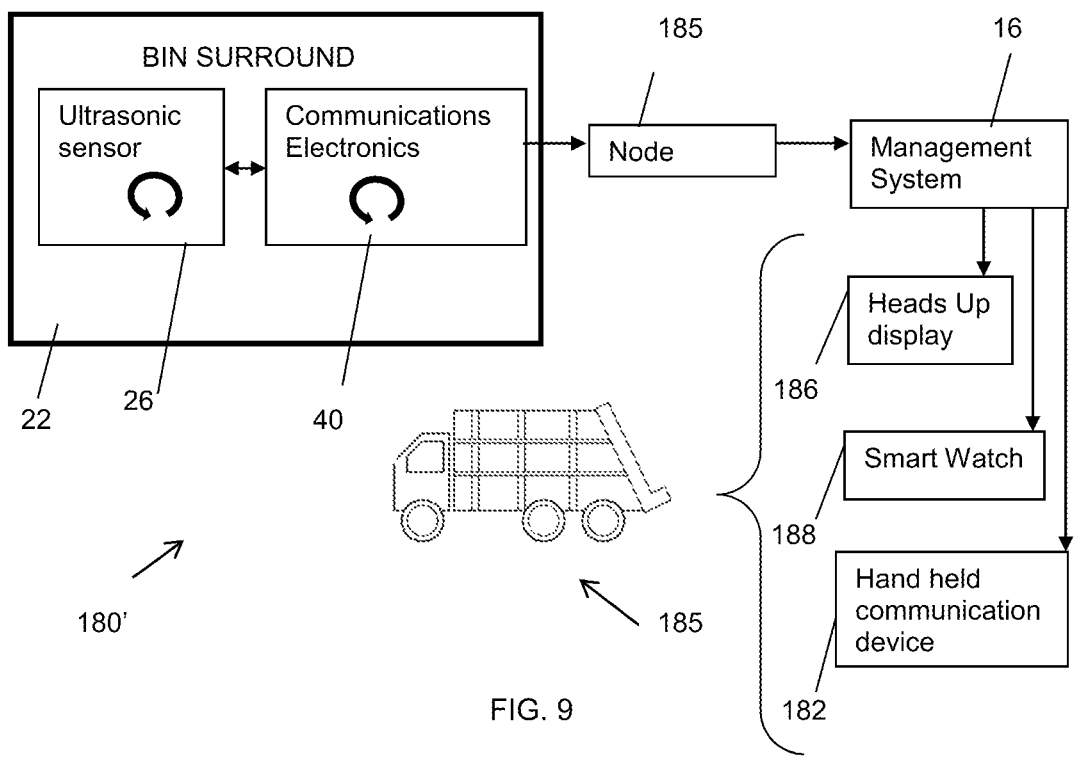
FIG. 9 is a block diagram of a waste management system according to an embodiment of the present invention.

Referring to FIG. 9 there is shown an alternative system 180' to the system 180, in which each bin is treated as a single node and it communicates directly with the management system 16. Alternatively another device may act as a node for many detectors 40.

Using these systems there can be a method of reading a rubbish level in a bin determining a distance of rubbish in a bin 20 from a sensor 26; determining the level of rubbish 30 in the bin 20 based on the distance as one or more discrete representations of the level of rubbish in the bin; outputting the level of rubbish in the bin and an identifier of the bin using a transmitter 28 or a device 152, or otherwise.

Using these systems there can be a method of scheduling waste collection from a plurality of bins comprising receiving a signal 36 representing a rubbish level and an identifier of the bin from each bin; determining which bins (12C and 12D) have reached a predetermined level of rubbish therein from the received level signals and bin identifiers; and scheduling waste collection for those bins that have reached the predetermined level.

Using these systems there can be a method of creating a waste collection route comprising receiving a signal 36 representing a rubbish level and an identifier of the bin from each bin; determining which bins (12C and 12D) have reached a predetermined level of rubbish therein from the received level signals and bin identifiers; determining the location of those bins that have reached the predetermined level; and determining a waste collection route (via bins 12C, 12B and then to 12D) to collect rubbish from those bins that have reached the predetermined level.

Using these systems there can be a method of a waste collection comprising receiving a signal 36 representing a rubbish level and an identifier of the bin from each bin; determining which bins (12C and 12D) have reached a predetermined level of rubbish therein from the received level signals and bin identifiers; determining the location of those bins that have reached the predetermined level; determining the position of a waste collector 185 and whether a bin that has reached the predetermined level is proximate to the waste collector; and indicating to the waste collector whether the proximate bin is to be emptied based on whether the proximate bin has reached the predetermined level.

Using these systems there can be a method of a waste collection comprising receiving a signal 36 representing a rubbish level and an identifier of the bin from each bin; determining the position of a waste collector and whether a bin that is proximate to the waste collector 185 has reached the predetermined level based on the received level signals and bin identifiers; and indicating to the waste collector whether the proximate bin is to be emptied based on whether the proximate bin has reached the predetermined level.

In an embodiment the step of indicating to the waste collector comprises transmitting information to the waste collector for display on a personal device 182, 186 or 188.

In an embodiment the step of indicating to the waste collector comprises transmitting information to the waste collector for display as an augmented reality on a display device, such as goggles or a heads up display device. In an embodiment the augmented reality display indicates the level of rubbish in the bin or whether the bin is to be emptied or not.

The augmented reality may be provided using an augmented reality browser on a mobile device, such as LAYAR.

In an embodiment the hand-held, wearable or dashboard mounted communication device on collector 185 may initiate communications with management system 16 over the communications link to query information including the height of waste within the bin surround. If the processor does not receive a signal the process repeats as determined by the settings of the processor. If the processor does receive a signal indicating query from a device the bin surround device communicates this information.

In an embodiment the management system 16 may initiate communications to the detector 40 over the communications link to query information including the height of waste within the bin surround. If the management system 16 does not receive a response it may repeat the request as determined by the settings. If the detector 40 does receive a signal indicating query from the management system 16 the detector may initiate communication.

In an embodiment where the detector comprises a pollution detector, one of the other sensors 226 of each bin is a pollution sensor for sensing one or more pollutants in the atmosphere in the vicinity of the respective bin surround.

The pollution sensor may comprise a carbon dioxide sensor, a nitrogen dioxide sensor, an airbourne particle sensor, a radiation sensor, a methane sensor, a poison sensor, a pollen sensor, a noise level sensor and/or a carbon monoxide sensor. These are intended to be examples only.

In an embodiment the pollution detector is configured to periodically transmit the air pollution levels to the processor.

In an embodiment the system processor 160 is configured to indicate to display on the electronic map as a "hotpsot" when pollution is detected above predetermined levels. The collected data relating to the environment of each bin may be combined into a map of the environmental conditions over an area.

In some instances the pollution detection may be tied to the waste management system as it may indicate a bin has overflowed, the contents of the bin is rotting, someone has dumped a pollutant in the bin instead of normal rubbish, that rubbish must be collected from this site as a priority or a certain time or that decontamination treatment of the bin may be required.

The "door open" detector may comprise a "door open" sensor, which may be in the form of a reed switch, for sensing when the bin cover is open.

In an embodiment the door detector is configured to periodically transmit the status of the door (open/shut) to the system processor 160.

In an embodiment the system processor determine if the door should be open or have stayed open for too long, and in which case may display an indicia of such on the electronic map on a display device such as an electronic rear view mirror and/or hand-held device and/or on the management system.

If the bin cover is left open after rubbish collection or is opened by someone else the bin will need attendance to close the cover so as to ensure protection of electronics & for suburban aesthetics.

In an embodiment the near field identification detector comprises a sensor for reading a near field identifier (NFI) is proximate to the bin. A NFI is for example a Radio Frequency Identification (RFID) tag that may be positioned in a waste collector's hand held device. Detection of the NFI will indicate attendance by the waste collector. Cessation of detecting the NFI will indicate departure of the waste collector. The time of attendance can be determined by the difference in the times between first detection and the time of cessation of detection.

In an embodiment the processor may be configured to transmit the attendance to the bin by the waste collector. In an embodiment the processor may be configured to transmit departure by the waste collector.

The NFC may also be held by maintenance personal which will indicate to the management system that a warning has been attended to or a scheduled maintenance has been performed. As an alternative to or in addition, other wireless technologies may be used to communicate with the waste collector or maintenance personnel, such as Bluetooth Low Energy.

Bins are usually relatively evenly distributed in urban areas which enabled them to be a convenient station for monitoring. The detector can be configured with a modular sensor pack that can have the required sensor installed according to the monitoring requirements.

Modifications may be made to the present invention within the context of that described and shown in the drawings. Such modifications are intended to form part of the invention described in this specification.

The invention claimed is:

1. A detection system for a rubbish receiving bin, the detection system comprising:
    a sensor positioned so as to sense the level of rubbish in the bin and for creating a signal representing the sensed rubbish level in the bin;
    an output for transmitting the level of rubbish in the bin;
    a receiver of the transmitted output;
    a transmitter for sending a signal to a personal device of a rubbish collector, the signal comprising a representation of the level of rubbish;
    wherein the personal device comprises a display configured to present the level of rubbish in the bin as an overlaid image on an image of the bin.

2. A system according to claim 1, wherein the transmitter is configured to transmit the signal to the personal device when the personal device is proximal to the bin.

3. A method of a waste collection comprising
    receiving a signal representing a rubbish level and an identifier of the bin from each bin;
    determining the position of a waste collector and whether a bin that is proximate to the waste collector has reached the predetermined level based on the received level signals and bin identifiers;
    indicating to the waste collector whether the proximate bin is to be emptied based on whether the proximate bin has reached the predetermined level; and
    determining whether the waste collector has attended to the collection.

4. A method according to claim 3, wherein the step of indicating to the waste collector comprises transmitting information to the waste collector for display on a personal device.

5. A method according to claim 3, wherein the step of indicating to the waste collector comprises transmitting information to the waste collector for display on an in-vehicle device.

6. A method according to claim 3, wherein the step of indicating to the waste collector comprises transmitting information to the waste collector for display as an electronic map on a display device, wherein the electronic map is updated showing the proximate bin has been collected from.

7. A method according to claim 3, wherein the step of indicating to the waste collector comprises transmitting the rubbish level to the waste collector for display of the rubbish level as an augmented reality on a display device.

8. A method according to claim 7, wherein the augmented reality indicates the level of rubbish in the bin or whether the bin is to be emptied or not as an image overlaid on an image of the bin.

9. A method according to claim 8, wherein the step of indicating to a personal device carried by a waste collector is triggered when the waste collector is proximal to the bin.

10. A method according to claim 8, wherein the step of indicating to the personal device of the waste collector comprises displaying an indicia of the rubbish level on an augmented reality on the display device.

11. A method according to claim 6, wherein the step of indicating to the personal device of the waste collector comprises displaying an indicia on a map display device.

12. A method of waste collection comprising receiving a signal representing a rubbish level and an identifier of the bin from each bin;

determining which bins have reached a predetermined level of rubbish therein from the received level signals and bin identifiers;

determining the location of those bins that have reached the predetermined level;

determining the position of a waste collector and whether a bin that has reached the predetermined level is proximate to the waste collector;

indicating to the waste collector whether a respective bin determined to the proximate to the waste collector is to be emptied based on whether the proximate bin has reached the predetermined level; and determining whether the waste collector has attended to the collection.

\* \* \* \* \*